(12) United States Patent
Sherman

(10) Patent No.: US 6,809,640 B1
(45) Date of Patent: Oct. 26, 2004

(54) HARNESS SAFETY ALARM

(75) Inventor: Robyn Ann Sherman, Batehaven (AU)

(73) Assignee: Phoenix Ventures Pty. Ltd., Manly (AU)

( * ) Notice: Subject to any disclaimer, the term of this patent is extended or adjusted under 35 U.S.C. 154(b) by 9 days.

(21) Appl. No.: 10/048,524

(22) PCT Filed: Jul. 27, 2000

(86) PCT No.: PCT/AU00/00895

§ 371 (c)(1),
(2), (4) Date: May 21, 2002

(87) PCT Pub. No.: WO01/08940

PCT Pub. Date: Feb. 8, 2001

(30) Foreign Application Priority Data

Jul. 30, 1999 (AU) .......................................... PQ 1946

(51) Int. Cl.[7] ................................................ B60Q 1/00
(52) U.S. Cl. .............................. 340/457.1; 340/539.11; 340/573.1
(58) Field of Search ........................ 340/457.1, 539.11, 340/539.1, 539.24, 539.31, 573.1, 573.7, 547

(56) References Cited

U.S. PATENT DOCUMENTS

| | | | |
|---|---|---|---|
| 3,912,939 A | * 10/1975 | Quantz et al. ........... | 340/573.1 |
| 4,157,540 A | * 6/1979 | Oros ...................... | 340/539.11 |
| 5,406,252 A | 4/1995 | Dear | |
| 5,523,740 A | * 6/1996 | Burgmann ................ | 340/573.4 |
| 5,596,312 A | * 1/1997 | Fowler et al. ........... | 340/457.1 |
| 5,627,512 A | 5/1997 | Bogar | |
| 5,742,986 A | 4/1998 | Corrion et al. | |
| 5,871,063 A | 2/1999 | Young | |
| 5,915,286 A | 6/1999 | Figi et al. | |
| 6,002,325 A | * 12/1999 | Conaway ................. | 340/384.1 |
| 6,339,371 B1 | * 1/2002 | Baggelaar et al. ....... | 340/457.1 |
| 6,351,210 B1 | * 2/2002 | Stewart ................... | 340/457.1 |

FOREIGN PATENT DOCUMENTS

| | | |
|---|---|---|
| AU | 45822/96 | 9/1996 |
| AU | 42407/99 | 4/2000 |
| WO | 98/29283 | 7/1998 |

* cited by examiner

*Primary Examiner*—John Tweel
(74) *Attorney, Agent, or Firm*—Andrus, Sceales, Starke & Sawall, LLP

(57) ABSTRACT

A harness safety alarm for providing a warning in the event that a seat belt is uncoupled comprises a proximity sensor (19) connected by strap (20, 21) to a seat belt buckle (13). A detectable means (22), such as a magnet, is attached by strap (23) to the tongue (16) of the seat belt. A warning unit (30), which is mounted remotely from the proximity sensor (19), provides an audible and visual warning if the seat belt is uncoupled. In particular, if the seat belt is uncoupled, the sensing means (19) sends a radio frequency signal to the warning unit (30) to thereby activate the audible and visual warning.

16 Claims, 3 Drawing Sheets

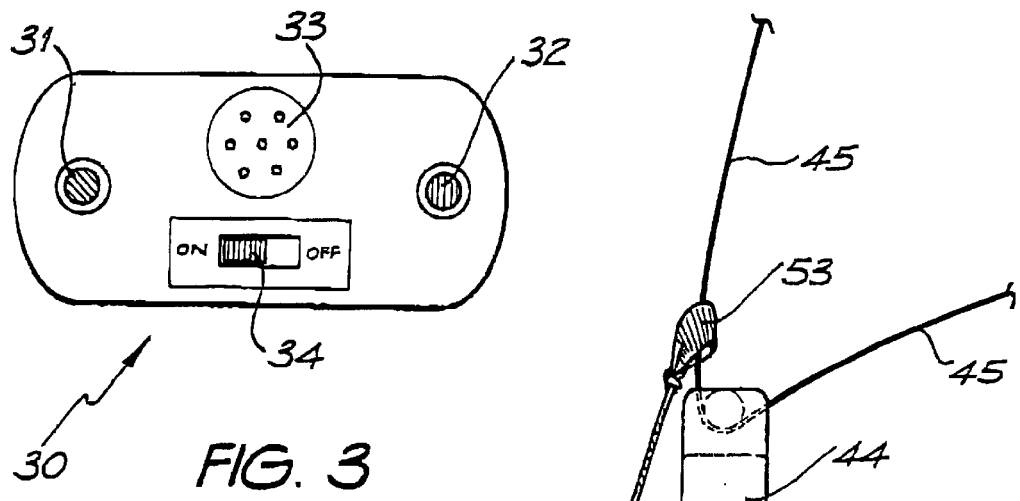
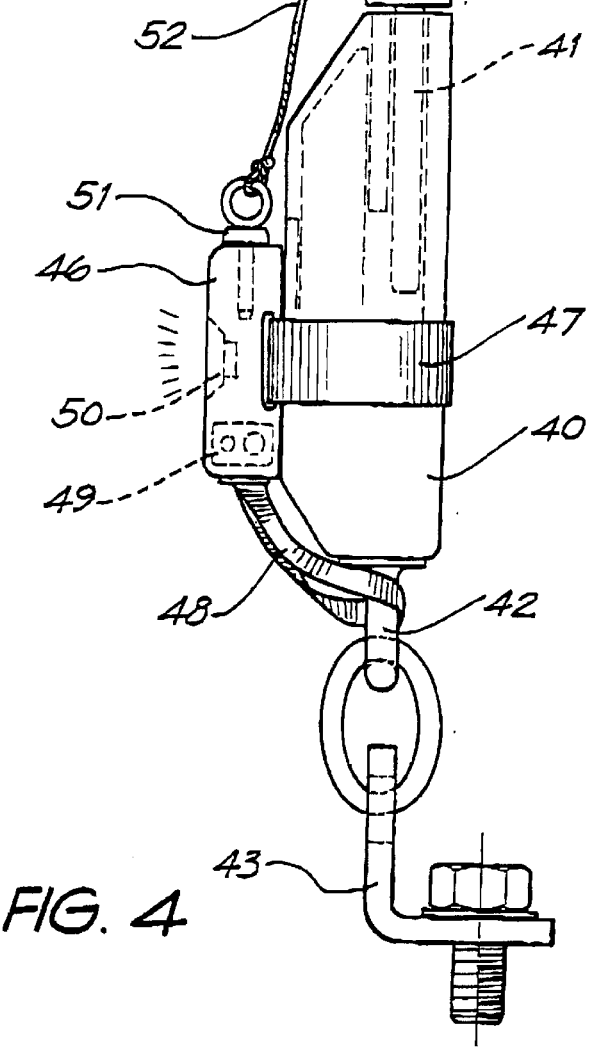

HARNESS SAFETY ALARM

CROSS REFERENCE TO RELATED APPLICATION

The present application is the U.S. national stage application of International Application PCT/AU00/00895, filed Jul. 27, 2000, which international application was published on Feb. 8, 2001 as International Publication WO 01/08940. The International Application claims priority of Australian Patent Application PQ 1946, filed Jul. 30, 1999.

FIELD OF THE INVENTION

The present invention relates to a harness safety alarm. In particular, the present invention relates to a harness safety alarm that can provide a warning when a safety harness, such as a seat belt, is undone or uncoupled.

BACKGROUND OF THE INVENTION

It is a legislative requirement of many countries that the occupants of motor vehicles be restrained by seat belts. For example, in Australia, it is compulsory that all persons travelling in a motor vehicle must wear a seat belt. The only exception to this law relates to a small number of people suffering from certain medical conditions. Similarly, most States in the United States of America now require that seat belts be worn. Although adults and older children readily accept the necessity of being restrained, a difficulty can arise with younger children who are physically capable of undoing seat belts but lack the understanding of the importance of always wearing the seat belts when travelling in a motor vehicle (in this context, "seat belts" includes safety harnesses on children's car seats as well as normal seat belts). Consequently, there is a risk that young children may undo their seat belt whilst the motor vehicle is in motion without the driver or parents being aware of this occurrence. The presence of an unrestrained child in the motor vehicle during travel is obviously not safe.

BRIEF DESCRIPTION OF THE INVENTION

It is an object of the present invention to provide a harness alarm that will give a warning in the event that a safety harness, such as a seat belt, is undone or uncoupled.

In a first aspect, the present invention provides a harness safety alarm for use with a harness that includes a buckle means for closing the harness, said buckle means including a first connecting means for connecting to a second connecting means, the alarm including a magnetic proximity sensor, first attachment means for mounting the proximity sensor to one of the first or second connecting means, a detectable means, second attachment means for mounting the detectable means to the other of the first or second connecting means, said magnetic proximity sensor detecting the presence of the detectable means when said first and second connecting means are coupled, warning means positioned remotely from the magnetic proximity sensor and signalling means for sending a signal between the sensor and the warning means when said magnetic proximity sensor detects that the detectable means is not in close proximity thereto, said signal causing said warning means to emit an audible and/or visual warning In a second aspect, the present invention provides a harness safety alarm for use with the harness that includes a buckle means for closing the harness, said buckle means including a first connecting means for connecting to a second connecting means, the alarm including sensing means for sensing when the first and connecting means are buckled up and for sensing seperation of the first and second sensing means, a warning means positioned remotely from the sensing means, signalling means for sending a signal between the sensing means and the warning means, wherein said sensing means causes a signal to be sent to the warning means when the sensing means senses that the first and second connecting means are seperated, and said signal causes said warning means to emit an audible and/or visual warning, and programmed means for detecting when the harness has been buckled up, said programmed means sending an activation signal to the warning means to activate the warning means when the programmed means detects that the harness has been buckled up.

The sensing means is preferably positioned on or adjacent to one of the first or second joining means.

Preferably, the buckle means includes a clasping means that clasps onto a tongue means, as is commonly used in car seat belts and child restraints. For convenience, the present invention will be hereinafter described with reference to this embodiment.

The sensing means is preferably positioned on or adjacent to the clasping means. The sensing means maybe constructed as a separate unit and affixed to the clasping means by any suitable means, such as the use of an adhesive, the provision of straps having hook and loop type fasteners (eg velcro straps), one or more belts having buckle-type fasteners or by providing the sensing means with any other suitable mounting means for mounting the sensing means to the clasping means. In this embodiment the alarm may be an after-market fitment to existing safety harnesses and motor vehicles. In this embodiment, the sensing means may further comprise attachment means for attaching the sensing means to the clasping means.

In another embodiment the sensing means is built into the clasping means. In this embodiment, the alarm may be an original equipment fitment to car seat belts or child restraint seats.

The sensing means preferably comprises a proximity sensor that senses when the tongue means is positioned close to the clasping means. More preferably, the sensing means comprises a proximity sensor that senses the presence of the tongue means when the tongue means is inserted into the clasping means. When the tongue means is removed from the clasping means, the sensing means senses that the tongue means is no longer close to the sensing means and activates the warning means.

The proximity sensor may comprise a magnetic proximity sensor. Such devices are known and include a magnetic field generation means that produces a magnetic field. Passing a metallic object into or through the magnetic field disrupts the magnetic field and electronics in the proximity sensor can detect that change. The warning means may then be activated.

The alarm may further comprise a detectable means that is detectable by the proximity sensor. The detectable means may comprise a metallic object positioned on or adjacent to the tongue means, or a magnet positioned on or adjacent to the tongue means. The detectable means ensures that the proximity detector detects when the tongue means is removed from the clasp by improving the sensitivity of the sensing means. The detactable means is preferably a separate unit to the tongue means. The detectable means preferably further comprises attachment means for attaching the detectable means to the tongue means. The attachment means may comprise one or more straps having hook and loop fasteners, one or more belts having buckle type fasteners, or an adhesive.

The alarm means also includes a warning means. In its simplest form, the warning means comprises an audible warning means for providing an audible warning should the harness be undone or uncoupled.

In a more preferred embodiment, the warning means includes an audible warning means and a visual warning means. In a particularly preferred embodiment, the warning means comprises a warning unit positioned remotely from the sensing means. In this embodiment the warning unit may be suitably positioned on the dashboard of the motor vehicle or otherwise in the driver's line of sight. The warning unit may provide a visual warning and/or an audible warning to the driver. By positioning the warning unit close to the driver or in the driver's line of sight, the chances of the warning going unheeded are slight. The warning means preferably further comprises mounting means for maintaining the warning means to the dashboard of a vehicle.

The apparatus may further comprise signalling means for sending a signal between the sensing means and the warning means. The signalling means at least sends a signal to the warning means when the proximity sensor detects that the tongue means is not in close proximity to the clasping means, for example, when the seat belt has been undone. More preferably, the signalling means essentially continuously sends a signal to the warning unit to provide an indication of the status of the seat belt at all times that the alarm is activated. In particular, the warning unit is preferably provided with a status indicator that indicates the status of the seat belt. The status indicator may comprise a green light that is lit when the seat belt is done up and a red light that is lit when die seat belt is undone. Preferably, an audible alarm also sounds when the seat belt is undone. The warning unit may also include an on/off switch for selectively activating and deactivating the warning unit.

The signalling means preferably sends a radio frequency signal to the warning unit. For example, the sensing means may include a radio transmitter that sends a radio signal to a radio receiving means in the warning unit. It will be appreciated that frequencies other than radio frequencies may also be used. Alternatively, the signalling means may pass along one or more wires between the sensing means and the warning means.

The warning unit may also provide a warning in the event that no signal is received from the signalling means (which may mean that the signalling means has no power).

In another embodiment of the present invention, the sensing means comprises an electrical circuit means which can form a closed circuit only when the safety harness is buckled, said electrical circuit means forming an open circuit when the safety harness is undone or uncoupled. Preferably, the electrical circuit means includes a receiving means for receiving a circuit closure means, the circuit closure means being insertable in the receiving means when the safety harness is done up, and the circuit closure means being removed from the receiving means when the seat belt is undone or uncoupled. The warning means will be activated in this embodiment when the sensing means detects an open circuit. The circuit closure means preferably comprises a pin positioned on or adjacent to the tongue means, with the pin being received in a complimentary shaped opening in the sensing means. In this embodiment, the sensing means is positioned on or adjacent to the clasping means. Preferably, the pin is connected to the tongue means or to the webbing or belt that holds the tongue means such that uncoupling the seat belt also removes the pin from the receiving means.

In another embodiment the circuit is an open circuit when the seat belt is done up and undoing the seat belt closes the circuit which activates the warning means. In this embodiment, a pin made from an electrically insulating material may be inserted into a receiving means, which pin acts to separate two contact points or plates that form part of the electrical circuit. Removal of the pin allows the contact points or plates to contact each other to thereby close the circuit.

It will be appreciated, of course, that in all embodiments of the invention where a particular feature of the apparatus is described as being positioned on one of the clasping means or tongue means and that feature interacts with another feature positioned on the other of the tongue means or clasping means, the invention will work equally as well if those particular features are positioned on the other of the clasping means or the tongue means.

The alarm may also be provided with a power source, which is most preferably a battery. The alarm may also be wired into the car's electrical system, if desired.

The alarm may also include an on/off switch to selectively operate the alarm. This allows the alarm to be turned off if no-one is travelling in that seat of the car. More advanced embodiments may include weight sensors in the seat for detecting if that seat is occupied and switching means for switching on the alarm if the seat is occupied. The switching means may be an automatic switching means.

In embodiments where the alarm includes a proximity sensor, the alarm may include programmed means for detecting when a seat belt has been done up, said programmed means sending an activation signal to the warning unit to turn on the warning unit. The programmed means may also include timer means for automatically turning off the warning unit a predetermined time (eg 10 minutes) after the alarm has detected that the seat belt has been undone. In such a case, the alarm interprets that removal of the seat belt without it being done up again within the predetermined period as meaning that the trip has been completed and the motor vehicle is now empty.

The sensing means may also include automatic on/off means that switches the sensing means on when the tongue is inserted into the buckle and turns the sensing means off a predetermined time, eg 10 minutes, after the sensing means indicates that the tongue has been removed from the buckle.

The warning means may also include an automatic on/off switch for turning off the warning means a predetermined time after detection of the seat belt undone or a predetermined time after the sensing means stops transmitting a signal to the warning means.

Preferred embodiments of the present invention will now be described with reference to the accompanying drawings. It will be appreciated that the accompanying drawings are provided for the purpose of illustrating the invention and that the invention should not be considered as limited to the embodiments as shown in the drawings.

BRIEF DESCRIPTION OF THE DRAWINGS

In FIG. 1, the seat belt is uncoupled;

FIG. 3 is a front view of a dash mounted warning unit for use with the seat belt alarm system shown in FIGS. 1 and 2; and FIG. 4 is a side view, partly in cross-section, of an alarm in accordance with another embodiment of the present invention.

DETAILED DESCRIPTION OF THE DRAWINGS

Figure 1:
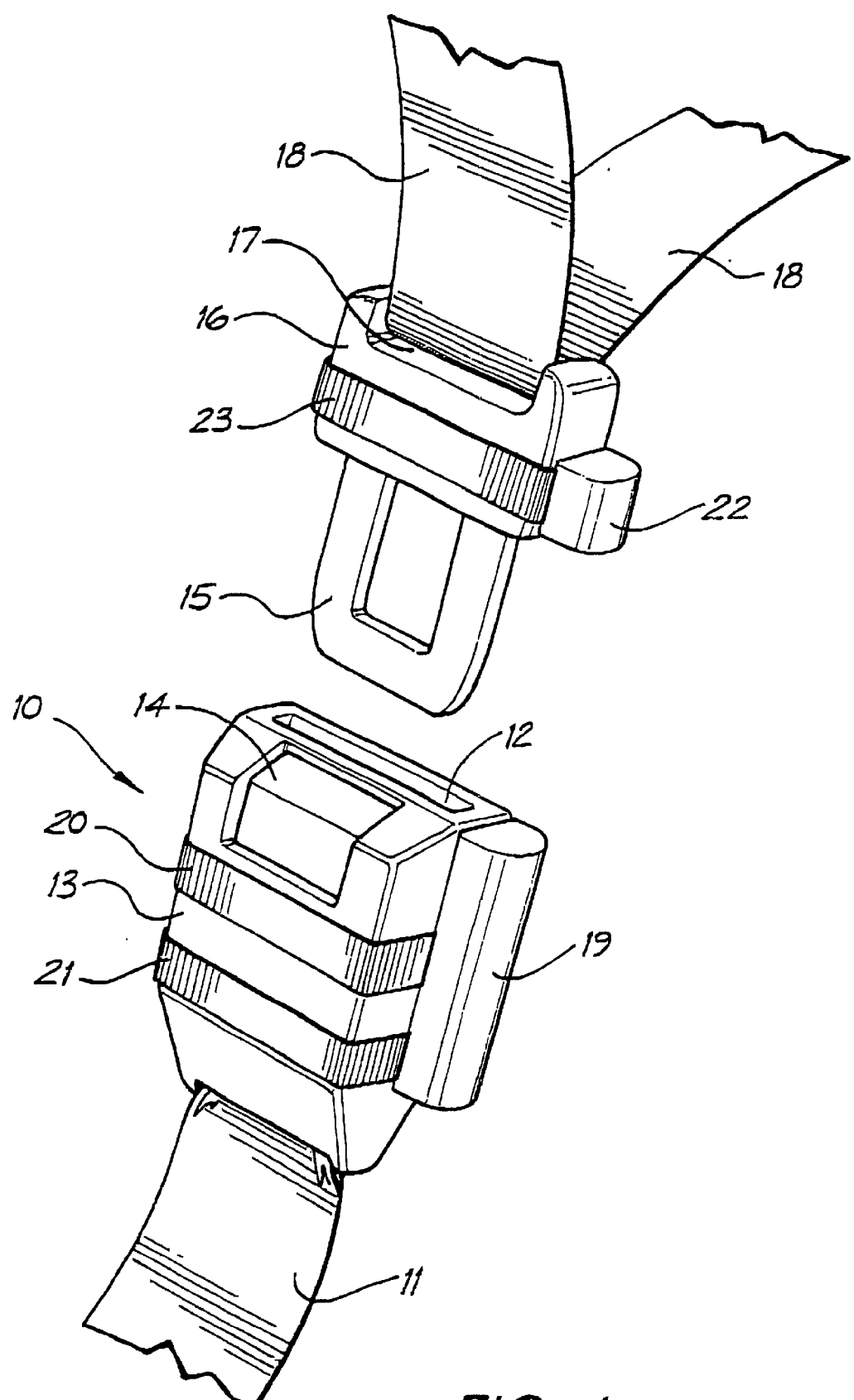
FIG. 1 shows a perspective view of a seat belt buckle arrangement having an alarm in accordance with the present invention attached thereto.
Figure 2:
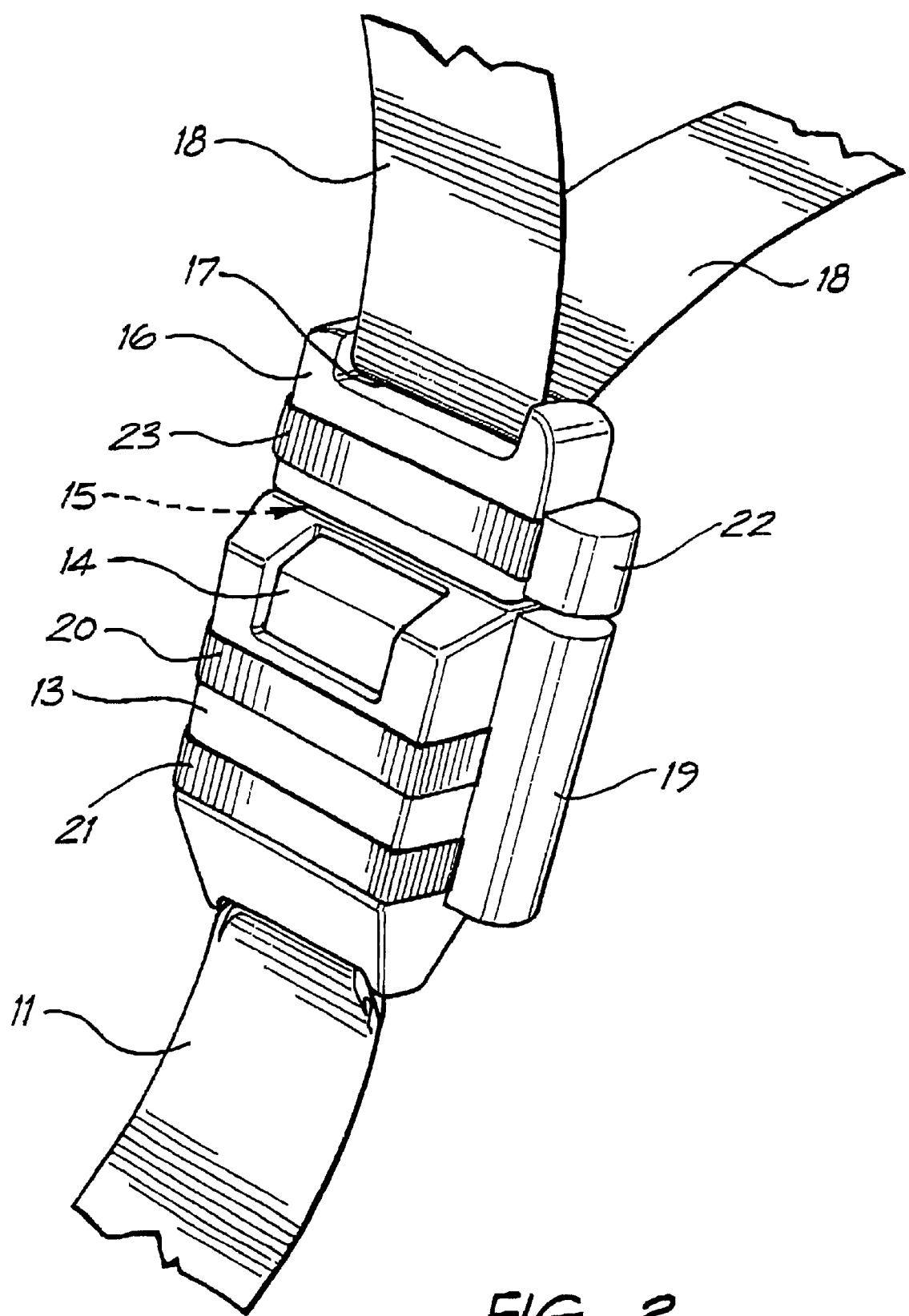
FIG. 2 is a front view of the seat belt buckle arrangement shown in FIG. 1, but with the seat belt closed.

Turning to FIGS. 1 and 2, the seat belt buckle arrangement includes a clasping means 10 attached to seat belt webbing 11. The clasping means 10 has a slot 12 formed in a body portion 13 thereof. A depressible member 14 allows the seat belt to be undone.

The seat belt buckle mechanism further includes a tongue means 15 that is insertable into slot 12. The tongue means 15 is connected to a body portion 16 that allows the tongue portion to be easily manipulated by a user of the seat belt. The body portion 16 includes a slot 17 through which seat belt webbing 18 passes. The seat belt is preferably of the inertia reel type as is commonly found in most motor vehicles.

The alarm in accordance with the present invention includes a first body portion 19 that is connected by velcro straps 20, 21 to the body portion 13 of the clasping means 10. The first body portion 19 includes a holder for a battery (not shown) a proximity sensor of the magnetic type and associated electronic componentry to enable the proximity sensor to sense the proximity of a detectable means 22 that is attached to the body portion 16 of tongue means 15. Detectable means 22 is attached via velcro strap 23 to the body portion tongue means 16.

The main body portion 19 of the alarm includes the proximity sensor. This proximity sensor is associated with an electronic circuit that can determine whether or not the detectable means 22 is within a defined or predetermined proximity to the proximity sensor. It is preferred that the proximity sensor is positioned at the upper end of first body portion 19.

As can be seen from FIG. 2, which shows the apparatus of FIG. 1 in use with the seat belt buckle being closed, when the tongue means 15 is inserted into the slot 12 to thereby buckle up the seat belt, the detectable means 22 is positioned closely to the proximity sensor that is located in the upper end of first body portion 19. However, when the tongue means 15 is removed from the slot 12, as is shown in FIG. 1, the detectable means 22 is no longer positioned closely to the proximity sensor at the upper end of first body portion 19.

The electronic circuitry included within the first body portion 19 is operative such that removal of the tongue means 15 from the slot 12, as occurs when the seat belt is unbuckled, causes the proximity sensor to detect that detectable means 22 is no longer in close proximity to the proximity sensor. The alarm then sends a signal to a warning means to activate a warning to alert the driver or other adult in the vehicle that the seat belt that had been placed around a young child has been unbuckled.

In a preferred embodiment of the present invention the warning means comprises a dash mounted unit, one embodiment of which is shown in FIG. 3. The dash mounted unit 30 includes a green indicator light 31 that is operative to show that the seat belt is buckled. The warning unit 30 also includes a red warning light 32 that is illuminated when the proximity sensor senses that the seat belt has been unbuckled, A speaker 33 also emits an audible warning alarm if the seat belt becomes unbuckled. The dash mounted unit 30 also includes a slide switch 34 that enables the warning unit 30 to be selectively turned on or off.

Warning unit 30 may include a battery pack for carrying a battery within the warning unit. Alternatively, warning unit 30 may be directly wired into the car's electrical system and obtain power therefrom. Warning unit 30 also preferably includes a radio receiver (not shown). In this embodiment, the first body portion 19 of the alarm also includes a radio transmitter that transmits a signal to the warning unit 30 in the event that the seat belt becomes unbuckled. The transmission of the warning signal from the radio transmitter to the radio receiver in warning unit 30 causes the red warning light 32 to flash and an audible alarm to sound from speaker 33.

It is also preferred that the electronic circuit in the first body portion 19 continuously sends a signal to the warning unit to advise the warning unit when the seat belt remains in the buckled position. This signal causes green light 31 to be illuminated, which light indicates that the alarm system is turned on and that the seat belt is buckled.

FIG. 4 shows another embodiment of the present invention. In this embodiment, the seat belt buckle includes a clasping means 40 and a tongue means 41 that is insertable into the clasping means 40. Clasping means 40 includes a loop 42 formed thereon that is attachable to a seat belt anchor point 43. Similarly, tongue means 41 is attached to a tongue means body portion 44 and seat belt webbing 45 passes through a slot in body portion 44.

The alarm system shown in FIG. 4 includes a first body portion 46 attached by a velcro strap 47 to the clasping means 40. Another velcro strap 48 attaches the first body portion 46 to the loop 42. The first body portion 46 carries a battery 49 for powering the unit. The unit also includes a speaker 50 for emitting an audible alarm.

An alarm pin 51 is attached by cord 52 and velcro strap 53 to seat belt webbing 45.

When the seat belt is buckled, the alarm pin 51 can be inserted into a receiving hole formed in first body portion 46. Insertion of the alarm pin 51 into the receiving bole closes an electrical circuit that is housed within the first body portion 46. In the event that the seat belt is unbuckled and the tongue means 41 removed from the clasping means 40, the alarm pin 51 will be pulled out of the main body portion and this will open the electrical circuit that is closed by alarm pin 51. The electronics contained within the first body portion 46 are programmed to read an open circuit as meaning that the seat belt has been unbuckled and a signal will then be sent to speaker 50 to activate an audible alarm.

Those skilled in the art will appreciate that the present invention is susceptible to variation and modifications other than those specifically described. In particular, in the embodiment shown in FIGS. 1 and 2, the first body portion 19 and the detectable means 22 may be positioned on the tongue means and clasping means, respectively, which is the reverse of the situation shown in FIGS. 1 and 2. Similarly, for the embodiment shown in FIG. 4, the alarm pin 51 may be attached to the clasping means 40 and the main body portion 46 of the alarm may be attached to the body portion 44 of the tongue means 41. In either case, the operation of the alarm will remain essentially the same. Moreover, the embodiments shown in FIGS. 1 to 4 show an alarm that can be fitted to existing seat belts. It will also be possible to have the alarm built into seat belts for new vehicles and new child restraints. With regard to the embodiment shown in FIGS. 1 to 3, the first body portion communicates with the warning unit via radio signals. Other communication means may be used, such a via wires or cable, or even infra-red communication (although the necessity to provide a line of sight for some infra-red communication systems may mitigate against using such a communication method).

It will be appreciated that the present invention encompasses all such variations and modifications that fall within its spirit and scope.

What is claimed is:

1. A harness safety alarm for use with a harness that includes a buckle means for closing the harness, said buckle means including a first connecting means for connecting to a second connecting means, the alarm including a magnetic proximity sensor, first attachment means for mounting the proximity sensor to one of the first or second connecting means, a detectable means, second attachment means for mounting the detectable means to the other of the first or second connecting means, said magnetic proximity sensor detecting the presence of the detectable means when said first and second connecting means are coupled, warning means positioned remotely from the magnetic proximity sensor and signalling means for sending a signal between the sensor and the warning means when said magnetic proximity sensor detects that the detectable means is not in close proximity thereto, said signal causing said warning means to emit an audible and/or visual warning.

2. A harness safety alarm as claimed in claim 1 wherein the buckle means comprises a clasping means and a tongue means insertable into the clasping means, and the magnetic proximity sensor is attached to the clasping means and the detectable means is attached to the tongue means.

3. A harness safety alarm as claimed in claim 1 wherein the detectable means comprises a metallic object or a magnet.

4. A harness safety alarm as claimed in claim 3 wherein the detectable means comprises a magnet.

5. A harness safety alarm as claimed in claim 1 wherein the signalling means essentially continuously sends a signal to the warning means to provide an indication of the status of the harness at all times the alarm is activated.

6. A harness safety alarm as claimed in claim 1 further including program means for detecting when the harness has been buckled up, said program means sending an activation signal to the warning means to activate the warning means when the programmed means detects that the harness has been buckled up.

7. A harness safety alarm as claimed in claim 1 wherein the signalling means comprises a radio transmitter that sends a radio signal to a radio receiving means in the warning means.

8. A harness safety alarm as claimed in claim 6 wherein the program means includes timing means for automatically turning off the warning means a predetermined time after the magnetic proximity sensor detects that the harness has been unbuckled.

9. A harness safety alarm as claimed in claim 1 wherein the magnetic proximity sensor further comprises an on/off means that switches the magnetic proximity sensor on when the first connecting means and the second connecting means are connected together and turns off the magnetic proximity sensor a predetermined time after the magnetic proximity sensor indicates that the first connecting means and the second connecting means have been separated.

10. A harness safety alarm as claimed in claim 1 wherein the magnetic proximity sensor comprises a body housing a magnetic sensing means and a radio frequency transmitter, the body including attachment means for attaching the body to a buckle of a seat belt, the harness safety alarm further including detectable means having attachment means for attaching the detectable means to a tongue portion insertable into the buckle, and the warning means includes mounting means for mounting to a dashboard of a vehicle and radio receiving means for receiving radio signals from the radio frequency transmitter.

11. A harness safety alarm for use with a harness that includes a buckle means for closing the harness, said buckle means including a first connecting means for connecting to a second connecting means, the alarm including sensing means for sensing when the first connecting means and the second connecting means are buckled up and for sensing separation of the first connecting means and the second connecting means, a warning means positioned remotely from the sensing means, signalling means for sending a signal between the sensing means and the warning means, wherein said sensing means causes a signal to be sent to the warning means when the sensing means senses that the first and second connecting means are separated, and said signal causes said warning means to emit an audible and/or visual warning, and programmed means for detecting when the harness has been buckled up, said programmed means sending an activation signal to the warning means to activate the warning means when the programmed means detects that the harness has been buckled up.

12. A harness safety alarm as claimed in claim 11 wherein the programmed means includes timing means for automatically turning off the warning means at a predetermined time after the sensing means detects that the first and second connecting means have been separated.

13. A harness safety alarm as claimed in claim 11 wherein the sensing means comprises a magnetic proximity sensor mounted to one of the first or second connecting means, said magnetic sensor detecting the presence of a detectable means mounted to the other of the first or second connecting means when the first and second connecting means are coupled together.

14. A harness safety alarm as claimed in claim 13 wherein the detectable means comprises a magnet.

15. A harness safety alarm as claimed in claim 2 wherein the detectable means comprises a metallic object or a magnet.

16. A harness safety alarm as claimed in claim 12 wherein the sensing means comprises a magnetic proximity sensor mounted to one of the first of second connecting means, said magnetic sensor detecting the presence of a detectable means mounted to the other of the first or second connecting means when the first and second connecting means are coupled together.

* * * * *